March 22, 1938.  E. H. LOCKWOOD ET AL  2,112,035
OVEN THERMOSTATIC SWITCH
Filed Feb. 14, 1935
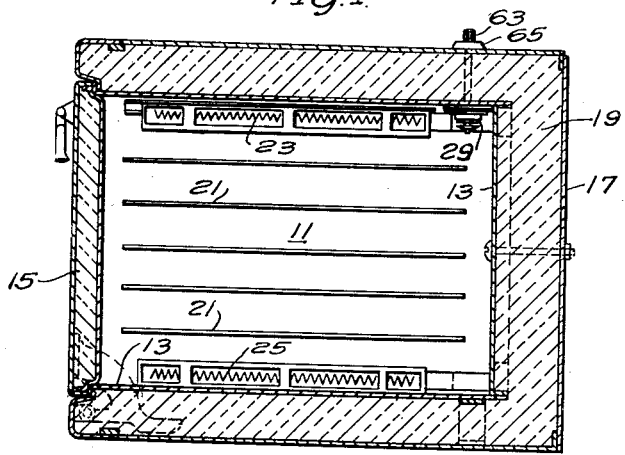
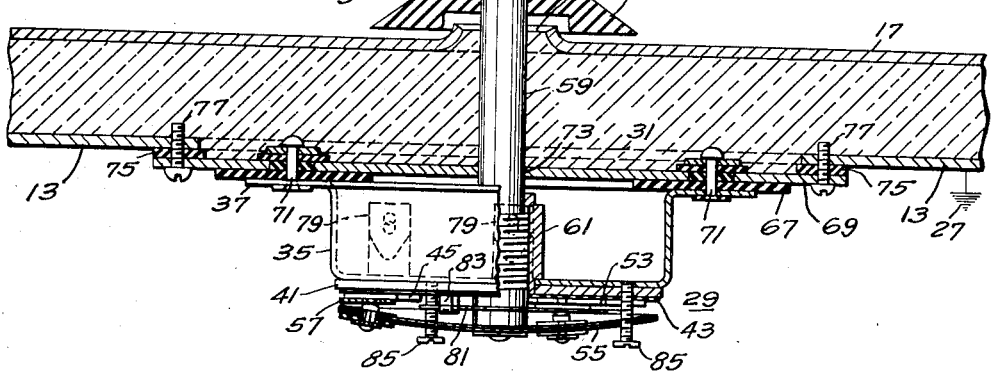
WITNESSES:
E. A. McCloskey
Wm. C. Groome
INVENTORS
Edwin H. Lockwood
and Edward Bletz
BY
W. R. Coley
ATTORNEY Patented Mar. 22, 1938

2,112,035

UNITED STATES PATENT OFFICE 2,112,035

OVEN THERMOSTATIC SWITCH

Edwin H. Lockwood, Mansfield, and Edward Bletz, Lexington, Ohio, assignors to Westinghouse Electric & Manufacturing Company, East Pittsburgh, Pa., a corporation of Pennsylvania Application February 14, 1935, Serial No. 6,468

2 Claims. (Cl. 200—139)

Our invention relates to electric range ovens and particularly to thermostatic control switches for such ovens.

An object of our invention is to provide a thermally actuable switch adapted to be located openly in a range oven chamber.

Another object of our invention is to provide a thermostatic switch assembly that shall be insulatedly supported within the chamber of a range oven defined by a grounded metal lining, in such manner that it will operate to break an electric circuit of relatively large current carrying capacity without danger of an arc occurring during the opening movement of the switch and contacting the grounded lining.

Another object of our invention is to provide a relatively simple and compact thermostatic switch located within the chamber of a cooking appliance that shall be adjustable from the outside thereof.

Another object of our invention is to provide a mounting for a snap acting thermostatic switch that shall cooperate therewith to give a relatively loud audible signal of its operation.

Other objects of our invention will either be specifically pointed out hereinafter or will be evident from the following description of one form of device embodying our invention now preferred by us.

In practicing our invention, we provide a range oven in which the cooking chamber is defined by one or more linings of metal, one or both being grounded, and which are provided with openings therein, in register with each other. A snap-acting thermostatic switch including a plurality of relatively movable contact members, is mounted on or supported by a dished member, which dished member is supported adjacent to the opening in the inner lining by a plurality of electric-insulating members which are spaced apart both axially and laterally of the dished member.

In the accompanying single sheet of drawings,

Figure 1 is a view in vertical section through a range oven in which there is located a thermostatic switch embodying our invention.

Figure 2 is a fragmentary view thereof, on a slightly enlarged scale, showing more particularly the thermostatic switch embodying our invention, and Fig. 3 is a plan view of the thermostatic switch with the bimetal disk removed therefrom.

So far as we are aware, all of the cooking appliances of the prior art which have associated therewith a thermal means for controlling the heating element for the appliance utilize a protected thermally-actuable means, that is, the contact members and the thermally-actuable element are not located openly in the cooking chamber proper. In contradistinction to this, our invention contemplates the use of a substantially open thermal element in direct heat-receiving relation with the heated atmosphere in a cooking chamber and in turn protecting the cooperating contact members controlling the energization of the heating means.

Referring first to Fig. 1 of the drawing, we have there illustrated a cooking chamber 11 defined by a plurality of inner metal walls 13 enclosing the cooking chamber 11 on all sides thereof except the front where the cooking chamber is enclosed by a double-walled door 15, in a manner well known in the art. The oven structure includes also an outer metal casing 17 having a plurality of walls similar to the walls of the inner lining and cooperating therewith to provide a space which may be filled with heat insulation 19, such as mineral wool. The specific details of the inner and of the outer lining and the method of connecting the same to provide or form an oven constitutes no particular part of our present invention and is shown for illustrative purposes only to more particularly set forth the construction and operation of the thermostatic switch constituting our invention.

The side walls of the inner lining may be provided with a plurality of horizontally-extending glides 21 to support food containers, in a manner well known in the art. The oven chamber may be heated by an upper electric heating element 23 and a lower electric heating element 25, although a single heating element alone may be utilized and located selectively in the upper and in the lower part of the oven chamber, all in a manner now well known in the art.

The requirement is now being made that the metal frame of such range ovens as well as of the entire range be grounded in a suitable manner, and this has been indicated diagrammatically at 27 in Fig. 2 of the drawing at the right hand end thereof. This is, of course, to provide greater safety for an operator working around or using the range.

We provide a thermostatic switch assembly 29 which may be located in any desired part of the oven chamber 11, but is preferably located at one side and at the rear of the chamber as far away from the door 15 as may be conveniently possible. The top wall of the inner oven lining 13 has a relatively large aperture 31 therein while the outer wall 17 has a smaller opening 33 therein, the two openings being in register with each other at the place where the switch is located.

The thermostatic switch assembly 29 includes a casing member 35, of cup shape, as will be seen by reference to Fig. 2 of the drawing and which further has a flat peripheral flange 37 having a plurality of openings 39 therein. The cup member 35 has secured against its outer or bottom surface a metal base plate 41 which may also be of circular shape and which has located against its outer surface a disk 43 of electric-insulating material, such as mica.

We provide a plurality of contact members which may be of flat arcuate shape and which include combined contact and terminal members 45 and 47 as well as flat arcuate contact members 49, 51, and 53. These fixed contact members are properly supported against the outer face of mica sheet 43 and are of the shapes shown particularly in Fig. 3 of the drawing.

A snap-acting dished bimetal disk 55 is supported by means to be hereinafter described on the outside of the fixed contact and terminal members described above and is of the kind disclosed and claimed in Patent No. 1,448,240 to J. A. Spencer. A plurality of contact bridging members 57 are insulatedly supported by the disk 55 adjacent its periphery. One of the contact bridging members 57 engages members 45 and 49, a second contact bridging member engages contact members 49 and 51 and a third contact bridging member engages contact and terminal members 53 and 47, when the disk 55 is in the closed position shown in Fig. 2 of the drawing. The disk 55 will move from the position shown in Fig. 2 of the drawing to a second opposite limiting position where it is dished in the reverse direction upon the occurrence of a sufficient change in the temperature thereof.

The disk 55 is mounted on a supporting and adjusting stud 59 which has screw-threaded engagement with a coaxial internally-threaded bushing 61 which is suitably secured to the intermediate portion of the dished member 35 and the base 41. The disk 55 is loosely supported at its central portion at one end of stud 59, while the other end of the stud projects outwardly, and in this case upwardly, through the two frame openings 31 and 33 and beyond the outer lining 17 a sufficient distance to permit of securing thereto an adjusting knob 63 having an integral collar 65 between the knob and the outer lining 17. While not shown in the drawing, we may provide the knob 63 with a pointer and the collar 65 with a temperature scale so that an operator will be able to turn the stud 59 to thereby adjust for a predetermined or desired temperature at which operation of the disk 55 will occur, by changing the radius of curvature thereof.

The flange 37 of the dished member 29 is located against the outer surface of a relatively thick layer 67 of electric-insulating material of substantially elongated rectangular shape such as mica, which in turn is located against the outer surface of a rectangular metal plate 69, the flange 37, mica plate 67 and metal plate 69 being held together in proper operative position by a plurality of rivets 71 which, as shown in Fig. 2 of the drawing, are suitably electrically-insulated from the sheet metal plate 69. This sheet metal plate has an opening 73 therein registering with the openings 31 and 33. A layer of asbestos 75 is located between the edge portions of plate 69 and the lining 13 and is held thereagainst by a plurality of short machine screws 77.

The device embodying our invention comprises a thermostatic switch whose thermally-actuable element is located, so to speak, openly in the cooking chamber of a cooking appliance such as an oven and the bimetallic disk protects the cooperating relatively movable contact members. If desired a wire frame guard (not shown) may be provided to prevent mechanical injury to the switch by the heater or by utensils. The switch is further provided with a plurality of contact terminals in the shape of studs 79 (see Fig. 2 of the drawing) so that suitable electrical connections may be made between the thermostatic switch and the heating element or heating elements so that these may be controlled by the switch.

In addition to the other details hereinbefore set forth, the thermal switch 29 includes an auxiliary heating element 81 supported adjacent to the outer surface of the mica sheet 43 by a plurality of refractory supports 83, this auxiliary resistor 81 being connected in series circuit relation with the circuit controlled by the switch and, therefore, being controlled by the cooperating contact members hereinbefore described. A snap-acting disk of the kind used by us has a relatively large temperature differential of operation and the use of the auxiliary heating element 81 of relatively small watt capacity tends to reduce this temperature differential of operation. We may provide additional means in the form of stop pins 85 as shown in Fig. 2 of the drawing secured to the base plate 41 and extending through large openings in the disk 55 to mechanically limit the amount of dishing of the disk when it moves into the second of its operative positions where it is dished oppositely to that shown in Fig. 2 of the drawing.

A switch of this kind may be called upon to control a circuit carrying 20 or even 30 amperes at 110 volts or half of those current values for 220 volts and the relatively compact construction of the thermostatic switch may result in very heavy arcs and consequent grounding to the grounded lining if the plurality of electric-insulating layers were not used. It is to be noted that the thermostatic switch is directly supported on a relatively large thin sheet metal plate 69 which is, in turn, supported at substantially its two ends, which are a relatively long distance apart, against a resilient inner sheet metal lining 13. Since the disk 55 will move from one of its limiting positions to its opposite limiting position with a snap action and since there will be a mechanical engagement between the disk and the stop pins or between the contact bridging members and the fixed contact members, it is obvious that a relatively loud noise will be produced by the action of the disk against the stop pins or of the bridging members against the contact members and that with the construction shown in the drawing and described above, the inner lining 13 will act as a vibrator and sounding board to increase this noise to thereby give an unmistakable and clear indication of its operation. Thus if it be assumed that the operator desires to know, during the heating up period, when the adjusted temperature has been reached, it will be necessary only to listen for the audible signal produced as noted above to know the exact instant when the desired temperature in the oven chamber has been reached.

Tests have been made by us on numerous thermostatic switches of the kind shown in the drawing and described in the specification in electrically heated ranges utilized for various cooking and roasting operations. The contact members and the disk were subjected not only to vapors arising from food being cooked or from the water used in cooking such food, but also to hot grease projected from the surface of a roast placed openly in the cooking chamber and the device embodying our invention has never failed to function properly.

The device embodying our invention thus provides a relatively simple, compact thermostatic switch controlling the heating means for a cooking chamber, which thermostatic switch is located openly and in direct heat-receiving relation to the heated interior of such cooking chamber.

It will therefore be more sensitive than other devices used heretofore for the same purpose and also less expensive.

Various modifications may be made in the device embodying our invention without departing from the spirit and scope thereof, and we desire, therefore, that only such limitations shall be placed thereon as are imposed by the prior art or are set forth in the appended claims.

We claim as our invention:

1. A thermostatic switch assembly comprising a metal member, a metal mounting plate secured against said member, an open-center sheet of electric-insulating material between the mounting plate and said member, a second sheet of electric insulating material against the outer surface of the mounting plate, a member of cup-shape having its edges located against the second sheet of electric insulating material, a plurality of fixed contact members insulatedly supported on the cup-shaped member, and a snap-acting bimetallic disc having contact bridging members mounted thereon to cooperate with the fixed contact members, whereby the formation of arcs from said contact members and bridging members to said metal member is prevented.

2. A thermostatic switch assembly comprising a thin metal wall with an aperture therein, a switch comprising a cup-shaped member, a metal mounting plate secured to said metal wall over said aperture, means for supporting the cup-shaped member from said plate substantially concentric with said aperture, fixed contact members insulatedly mounted on said cup-shaped member adjacent one surface thereof, a snap-acting bimetallic disc located outside of said fixed contact members, contact bridging members supported by the disc and cooperating with said fixed contact members, whereby snap action of said disc causes vibration of said wall to give an audible signal.

EDWIN H. LOCKWOOD.
EDWARD BLETZ.